(12) United States Patent
Vazquez et al.

(10) Patent No.: US 11,702,126 B2
(45) Date of Patent: Jul. 18, 2023

(54) COMPACT POWER STEERING SYSTEM

(71) Applicant: Schaeffler Technologies AG & Co. KG, Herzogenaurach (DE)

(72) Inventors: Andre Vazquez, Fort Mill, SC (US); Craig Hooker, Indian Land, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 364 days.

(21) Appl. No.: 16/928,325

(22) Filed: Jul. 14, 2020

(65) Prior Publication Data

US 2021/0016821 A1 Jan. 21, 2021

Related U.S. Application Data

(60) Provisional application No. 62/875,539, filed on Jul. 18, 2019.

(51) Int. Cl.
*B62D 5/04* (2006.01)
*F16H 49/00* (2006.01)

(52) U.S. Cl.
CPC ........... *B62D 5/0415* (2013.01); *B62D 5/043* (2013.01); *F16H 49/001* (2013.01)

(58) Field of Classification Search
CPC .... B62D 5/0008; B62D 5/0415; B62D 5/043; F16H 49/001; F16H 57/0037; F16H 57/12
USPC ...................................... 74/388 PS; 180/443
See application file for complete search history.

(56) References Cited

U.S. PATENT DOCUMENTS

| | | | |
|---|---|---|---|
| 3,239,699 A * | 3/1966 | Ferrary | H02K 7/116 310/83 |
| 3,396,556 A | 8/1968 | Giegerich | |
| 5,631,511 A | 5/1997 | Schulmann et al. | |
| 5,660,591 A * | 8/1997 | Reynolds | F16D 3/74 277/912 |
| 6,012,347 A | 1/2000 | Hasegawa | |
| 6,029,768 A * | 2/2000 | Kiyosawa | B62D 5/0415 180/444 |
| 6,671,475 B2 * | 12/2003 | Katada | G03G 15/1615 464/154 |
| 7,658,678 B2 | 2/2010 | Kneeshaw et al. | |
| 8,262,485 B2 * | 9/2012 | Lehmann | F16D 3/68 464/75 |
| 10,753,427 B2 * | 8/2020 | Nakagawa | F16H 1/32 |
| 2006/0030445 A1 | 2/2006 | Zheng et al. | |
| 2006/0213320 A1 * | 9/2006 | Menjak | B62D 5/008 74/640 |
| 2008/0251311 A1 * | 10/2008 | Waibel | B62D 5/0436 180/443 |
| 2009/0031852 A1 * | 2/2009 | Yamamori | B62D 5/008 74/650 |
| 2010/0004823 A1 * | 1/2010 | Nakatsu | B62D 5/008 701/41 |
| 2020/0313498 A1 * | 10/2020 | Tucker | H02K 7/116 |

* cited by examiner

Primary Examiner — Joseph Brown

(57) ABSTRACT

A compact power steering system is suitable for small vehicles. A torque sensor on a steering shaft detects operator intention to turn. In response, a motor provides torque to assistance in rotating the steering shaft. A strain wave gear set multiplies the motor torque. A coupler having a torsional isolator links the gearbox output to the steering shaft.

7 Claims, 4 Drawing Sheets

COMPACT POWER STEERING SYSTEM

CROSS-REFERENCE TO RELATED APPLICATIONS

This application claims priority to U.S. Provisional Application 62/875,539 filed Jul. 18, 2019, the entire disclosure of which is incorporated by reference herein.

TECHNICAL FIELD

The disclosure pertains to the field of vehicle steering systems. In particular, the disclosure pertains to a steering system utilizing a strain wave gear set and a flexible coupler between a gear set element and a central shaft.

BACKGROUND

Simple vehicle steering systems accept input from driver rotation of a steering wheel and alter the axis of rotation of vehicle wheels in response. Sometimes the force required to alter the axis of rotation can be high, even for small vehicles, such as when the vehicle is moving at low speed on surfaces with high friction, such as mud. The steering system may include gearing to multiply the torque exerted by the driver, but that increases the degree of rotation of the steering wheel needed. Power steering systems make vehicles easier to drive by multiplying the driver exerted torque without a corresponding increase in the degree of rotation required. Conventional power steering systems developed for large vehicles may not fit in the limited space available in small vehicles.

SUMMARY

A power steering system includes a central shaft, a motor, first and second coupling elements, a ring, and a gear set. The motor has a rotor supported for rotation about the shaft. The first coupling element is fixed to the shaft and has a first set of external teeth. The second coupling element has internal teeth interspersed with the external teeth. The ring has compressible, resilient prongs extending between the internal teeth and the external teeth. The gear set drivably connects the rotor to the second coupling element such that the second coupling element rotates slower than the rotor. The gear set may be a strain wave gear set including a fixed housing, an eccentric inner ring, and a flexible band. The fixed housing may have a second set of internal teeth. The eccentric inner ring may be fixed to the rotor. The flexible band may be supported by the eccentric inner ring by a bearing. The flexible band may have a second set of external teeth that mesh in at least one circumferential region with the second set of internal teeth. The strain wave gear set may also include a third set of internal teeth on the second coupling element which mesh in the at least one circumferential region with the second set of external teeth. A number of teeth in the third set of internal teeth may be less than a number of teeth in the second set of internal teeth. The number of teeth in the third set of internal teeth may differ by exactly two from the number of teeth in the second set of internal teeth.

A power steering system includes a central shaft, a motor, a fixed housing, an eccentric inner ring, and a flexible band. The motor has a rotor supported for rotation about the shaft. The fixed housing has a first set of internal teeth. The eccentric inner ring is fixed to the rotor. The flexible band is supported by the eccentric inner ring by a bearing. The flexible band has a first set of external teeth that mesh in at least one circumferential region with the first set of internal teeth. The power steering system may also include a coupler having a coupler input and a coupler output separated by a compressible, resilient element. The coupler output may be fixed to the shaft. The coupler input may have a second set of internal teeth which mesh in the at least one circumferential region with the external teeth. A number of teeth in the second set of internal teeth may be less than a number of teeth in the first set of internal teeth. The number of teeth in the second set of internal teeth may differ by exactly two from the number of teeth in the first set of internal teeth. The coupler output may have a second set of external teeth. The coupler input may have a third set of internal teeth interspersed with the second set of external teeth. The compressible, resilient element may be a ring having prongs that extend between the teeth of the third set of internal teeth and the teeth of the second set of external teeth.

A method of assembling a power steering system includes fixing a first coupling element to a shaft, sliding a torsional isolator over the first coupling element, and sliding a second coupling element over the torsional isolator. The first coupling element has a set of external teeth. The torsional isolator has a ring and a set of compressible, resilient prongs. The second coupling element has internal teeth. The prongs extend between the internal teeth and the external teeth. The method may also include drivably connecting a rotor of an electric motor to the second coupling element. The rotor may be drivably connected to the second coupling element by a speed reduction gearbox. The speed reduction gearbox may be a strain wave gear set.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
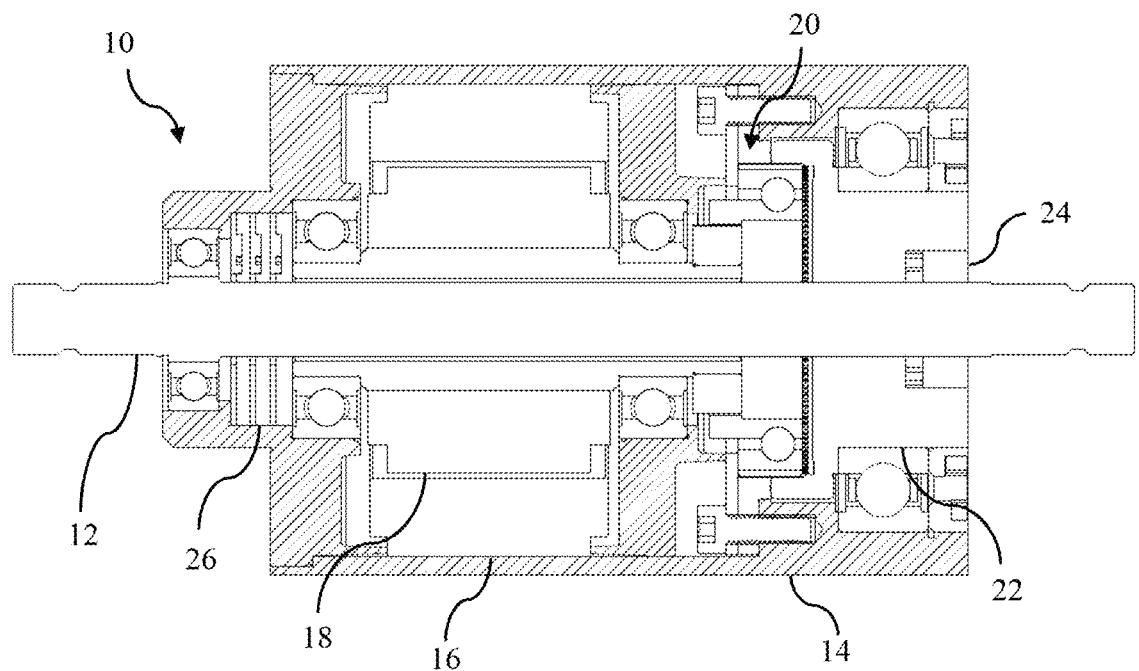
FIG. 1 is a cross section of a power steering system.

FIG. 1 illustrates a compact power steering system 10 suitable for use, for example, in a personal recreational vehicle, in which the space typically occupied by a conventional automotive power steering system is not available. The various components are designed to be small in diameter and to be arranged concentrically with a steering shaft 12. Shaft 12 extends from a steering input device such as handlebars or a steering wheel to a steering mechanism that changes the rotational axis of the front vehicle wheels. The system is contained within a housing 14 which is fixed to vehicle structure.

A motor indirectly exerts torque on shaft 12 to multiply the torque exerted by the vehicle driver. The motor includes a stator 16 fixed to housing 14 and a rotor 18 which is supported for rotation about the shaft 12. A strain wave gear set 20 provides speed reduction and torque multiplication and drives coupler input 22. Coupler input 22 transmits torque to coupler output 24 via a flexible isolator. Coupler output 24 is fixed to shaft 12.

The commanded motor torque is based on the shaft torque as sensed by torque sensor 26. Specifically, when the driver exerts a torque on the steering input device, that torque is sensed by sensor 26. In response, a controller adjusts electrical current supplied to stator 16 such that the motor exerts torque in the same direction. The motor torque is multiplied by strain wave gear set 20 and added to the driver supplied torque by the coupler such that the torque exerted on the steering mechanism is in the same direction as the driver exerted torque but many times greater in magnitude.

Figure 2:
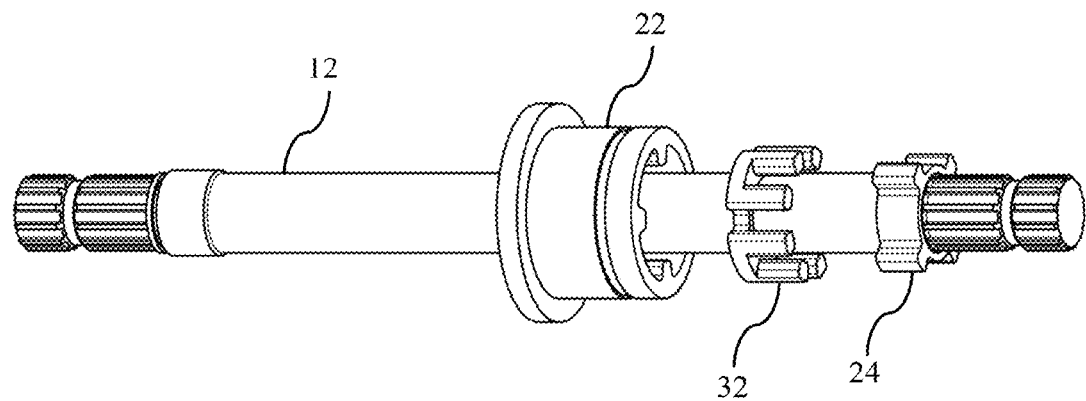
FIG. 2 is a pictorial exploded view of a coupler suitable for use in the power steering system of FIG. 1.
Figure 3:
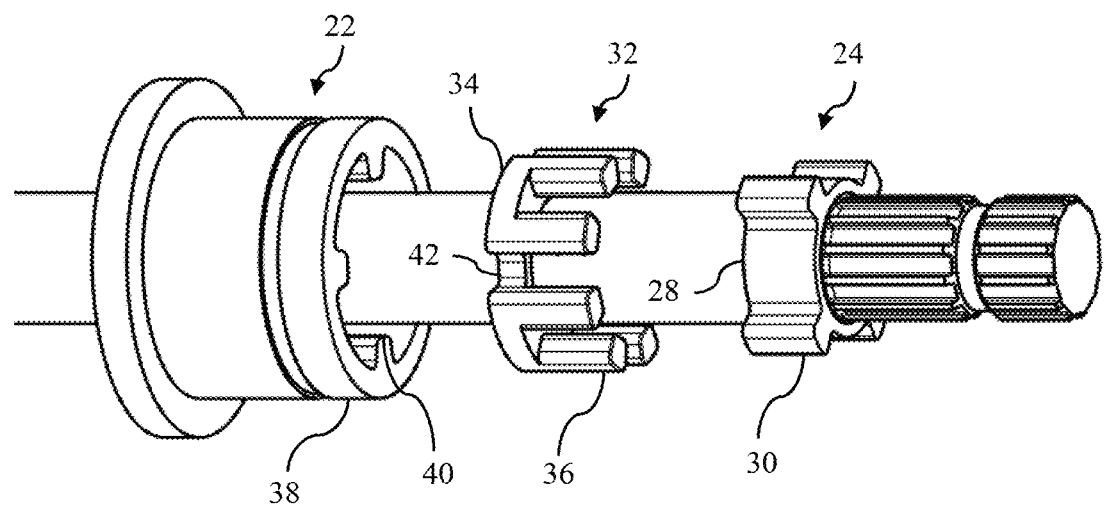
FIG. 3 is a detailed view of FIG. 2.

FIGS. 2 and 3 illustrate the coupler in more detail. In these Figures, the coupler is shown in an exploded view such that the parts can be seen more clearly. Coupler output 24 is fixed to shaft 12 by press fit, key, spline, or other means of fixation that prevents relative rotation. Coupler output includes annular portion 28 and external teeth 30 extending radially outward from annular portion 28. Flexible ring 32 slides over coupler output 24. Flexible ring 32 includes disk 34 and prongs 36 which extend axially from disk 34. Flexible ring 32 is fabricated from a compressible, resilient material such as rubber. Coupler input 22 slides over coupler output 24 and flexible ring 32. Coupler input 22 includes hollow annular portion 38 and a first set of internal teeth 40 extending radially inwardly from annular portion 38. The number of internal teeth 40 is equal to the number of external teeth 30. There are twice as many prongs 36 as internal teeth or external teeth. In the illustrated example, there are four internal teeth, four external teeth, and eight prongs. Disk 34 has radial indentations 42 to accommodate the internal teeth 40 as coupler input 22 slides over flexible ring 32. Each external tooth 30 is separated from the adjacent internal teeth 40 by a prong 36. Due to the mechanical linkage to the wheels, shaft 12 may be subject to sudden, small amplitude rotations. High frequency rotations of shaft 12 are absorbed by the compression of the prongs, isolating the gear set and rotor from these oscillations.

Figure 4:
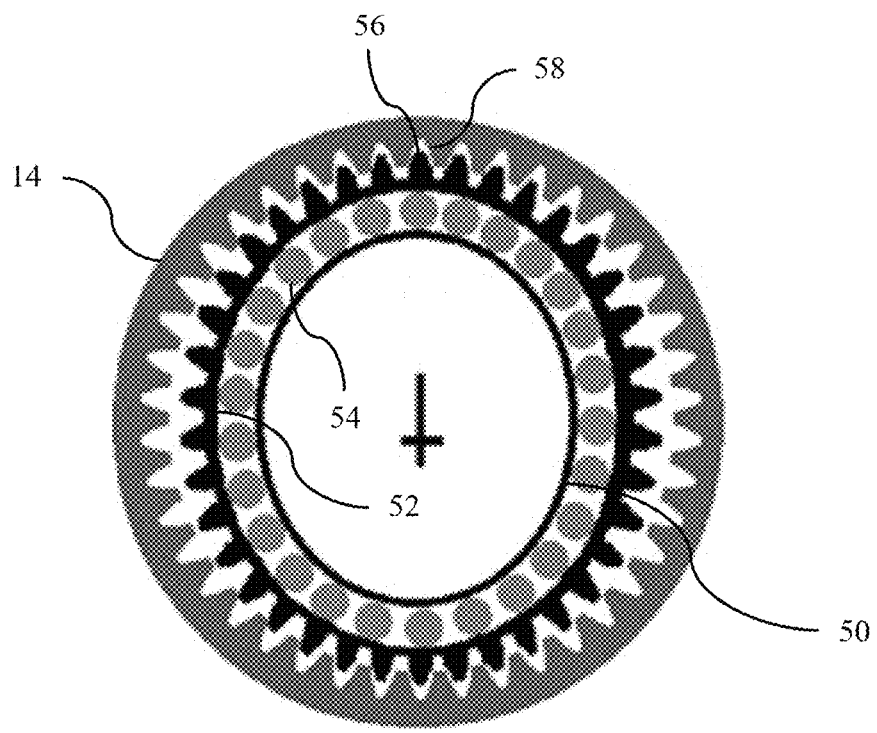
FIG. 4 is a cross section of a strain wave gear set in a first position.
Figure 5:
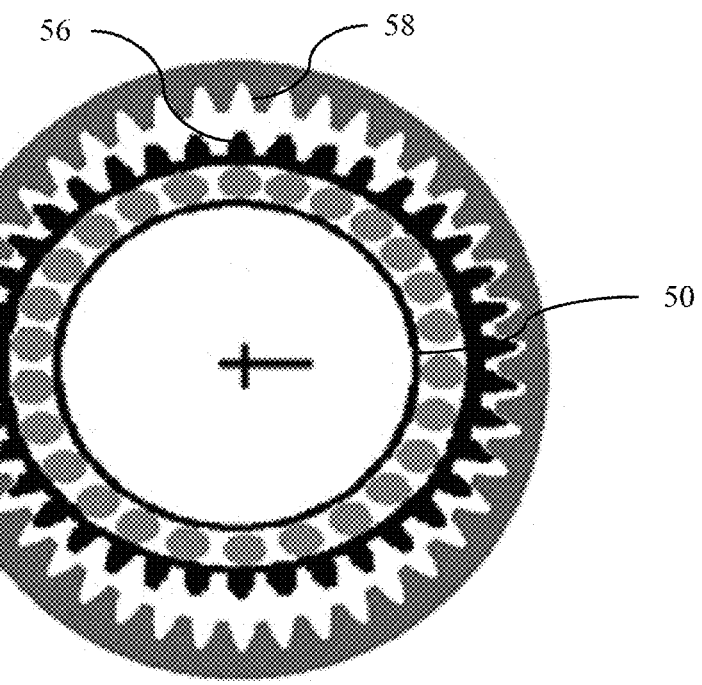
FIG. 5 is a cross section of the strain wave gear set of FIG. 4 in a second position.
Figure 6:
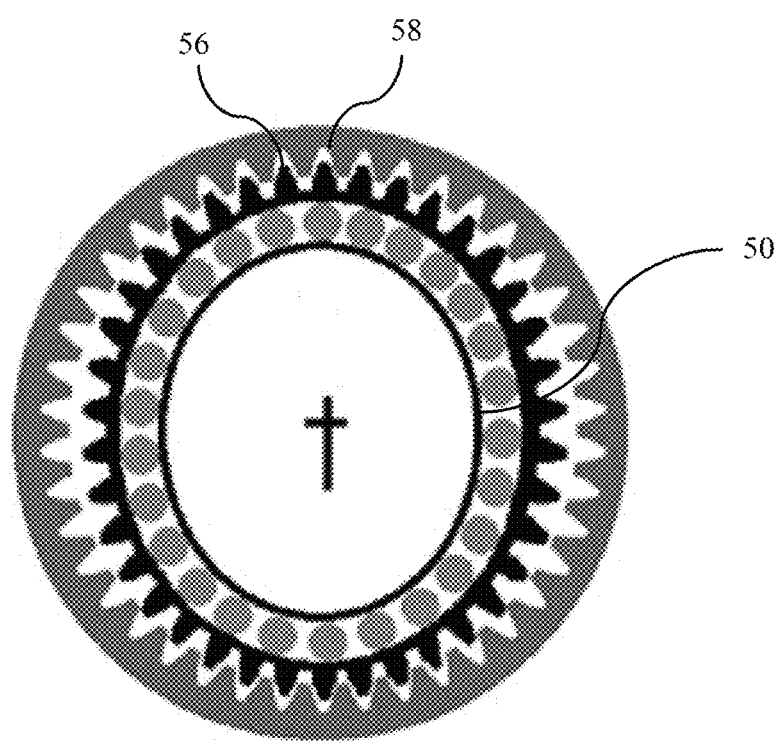
FIG. 6 is a cross section of the strain wave gear set of FIG. 4 in a third position.

The strain wave gear set is illustrated in FIGS. 4-6. An elliptical inner ring 50 is fixed to the rotor. A flexible band 52 with external teeth is supported around the elliptical inner ring 50 via rollers 54 which permit relative rotation with low friction. The external teeth mesh with internal teeth of housing 14 and a second set of internal teeth of coupler input 22. The number of internal teeth on the housing slightly exceeds the number of teeth in the second set of internal teeth of coupler input 22. For example, the housing may have two more internal teeth than the second set of internal teeth of the coupler input. The external teeth of the flexible band engage the internal gear teeth in two regions on opposite sides of the axis of rotation. Between these regions, the teeth of the flexible band are radially inward of the internal gear teeth.

FIG. 5 shows the components with the elliptical inner ring rotated 90 degrees clockwise from the position of FIG. 4. FIG. 6 shows the components with the elliptical ring rotated 90 degrees clockwise from the position of FIG. 5 (180 degrees from the position of FIG. 4). In the position of FIG. 4, a reference external tooth 56 is in a reference gap 58 between internal teeth. In the position of FIG. 5, the reference external tooth 56 is not engaging any of the internal teeth. However, other external teeth 90 degrees from the reference tooth have come into engagement with both the internal teeth of housing 14 and the internal teeth of coupler input 22 (not shown). The insertion of external teeth into gaps forces the gaps of the housing 14 and the gaps of the coupler 22 to be aligned in the vicinity of the engaged teeth, but not in the vicinity of the disengaged teeth. Since the number of internal teeth (and therefore the number of gaps) on the coupler is less than the number of internal teeth on the housing, the coupler input 22 must rotate slightly counterclockwise. (If the number of internal teeth on coupler input 22 were slightly greater than on housing 14, then it would rotate slightly clockwise.) In the position shown in FIG. 6, the reference external tool 56 occupies a gap one position away from the gap that it occupied in the position of FIG. 4.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:
1. A power steering system comprising:
 a central shaft;
 a motor having a rotor supported for rotation about the shaft;
 a first coupling element fixed to the shaft and having a first set of external teeth;

a second coupling element having internal teeth interspersed with the external teeth;
a ring having compressible, resilient prongs extending between the internal teeth and the external teeth; and
a strain wave gear set drivably connecting the rotor to the second coupling element such that the second coupling element rotates slower than the rotor, the strain wave gear set comprising:
a fixed housing having a second set of internal teeth;
an eccentric inner ring fixed to the rotor;
a flexible band supported by the eccentric inner ring by a bearing and having a second set of external teeth that mesh in at least one circumferential region with the second set of internal teeth; and
a third set of internal teeth on the second coupling element which mesh in the at least one circumferential region with the second set of external teeth.

2. The power steering system of claim 1 wherein a number of teeth in the third set of internal teeth is less than a number of teeth in the second set of internal teeth.

3. The power steering system of claim 1 wherein a number of teeth in the third set of internal teeth differs by exactly two from a number of teeth in the second set of internal teeth.

4. A power steering system comprising:
a central shaft;
a motor having a rotor supported for rotation about the shaft;
a fixed housing having a first set of internal teeth;
an eccentric inner ring fixed to the rotor;
a flexible band supported by the eccentric inner ring by a bearing and having a first set of external teeth that mesh in at least one circumferential region with the first set of internal teeth; and
a coupler having a coupler input and a coupler output separated by a compressible, resilient element, the coupler output fixed to the shaft, the coupler input having a second set of internal teeth which mesh in the at least one circumferential region with the external teeth.

5. The power steering system of claim 4 wherein a number of teeth in the second set of internal teeth is less than a number of teeth in the first set of internal teeth.

6. The power steering system of claim 4 wherein a number of teeth in the second set of internal teeth differs by exactly two from a number of teeth in the first set of internal teeth.

7. The power steering system of claim 4 wherein:
the coupler output has a second set of external teeth;
the coupler input has a third set of internal teeth interspersed with the second set of external teeth; and
the compressible, resilient element is a ring having prongs that extends between the teeth of the third set of internal teeth and the teeth of the second set of external teeth.

* * * * *